United States Patent
Bachand et al.

[11] Patent Number: 5,810,999
[45] Date of Patent: Sep. 22, 1998

[54] WATER STRAINER/PURIFIER AND METHOD OF USING SAME

[75] Inventors: Steven P. Bachand, Pawtucket; Raymond P. Denkewicz, Jr.; Mark A. Bollinger, both of Warwick; Francis M. Lubrano, Narragansett, all of R.I.

[73] Assignee: Fountainhead Technologies, Inc., Providence, R.I.

[21] Appl. No.: 757,472

[22] Filed: Nov. 27, 1996

[51] Int. Cl.[6] .............................. B01D 35/28; B01D 29/88
[52] U.S. Cl. ......................... 210/206; 210/169; 210/305; 210/416.2; 210/448; 210/456; 422/263; 422/278
[58] Field of Search .................................... 210/169, 232, 210/305, 416.2, 436, 448, 456, 790, 205, 206; 422/263, 278

[56] References Cited

U.S. PATENT DOCUMENTS

| | | |
|---|---|---|
| 2,989,979 | 6/1961 | Karlson . |
| 3,616,916 | 11/1971 | Greene .................................... 210/169 |
| 3,677,408 | 7/1972 | Dinizo, Jr. .............................. 210/169 |
| 4,804,478 | 2/1989 | Tamir ..................................... 210/169 |
| 4,876,003 | 10/1989 | Casberg .................................. 210/169 |
| 5,066,408 | 11/1991 | Powell .................................... 210/169 |
| 5,124,032 | 6/1992 | Newhard ................................. 210/169 |
| 5,352,369 | 10/1994 | Heinig, Jr. .............................. 210/760 |
| 5,374,119 | 12/1994 | Scheimann .............................. 422/263 |
| 5,427,748 | 6/1995 | Weidrich et al. ....................... 210/169 |
| 5,447,641 | 9/1995 | Wittig . |
| 5,554,277 | 9/1996 | Rief et al. ............................... 210/169 |
| 5,582,718 | 12/1996 | Sobczak .................................. 210/169 |

Primary Examiner—Neil McCarthy
Attorney, Agent, or Firm—Dean W. Russell; Kilpatrick Stockton LLP

[57] ABSTRACT

A water-purifying device has both a strainer and water purification materials, as well as an inlet and outlet. In the preferred embodiment, the water purification materials are contained within a separable purifier housing, and a deflector extending from a support plate into a strainer housing deflects incoming water to the purification materials. The device has particular application to claimed methods of purifying water for swimming pools, spas, cooling towers, fountains and the like. The purifier housing may be an attachment to existing pump inlet strainer basket housings.

11 Claims, 4 Drawing Sheets

WATER STRAINER/PURIFIER AND METHOD OF USING SAME

BACKGROUND OF THE INVENTION

The invention relates to a water purifier for treating water.

Water must be effectively treated before it can be used in confined volumes such as swimming pools, hot tubs and spas, which are highly susceptible to rapid microorganism growth and can become health hazards if not properly and regularly treated. Common methods of treating water to kill microorganisms include manually adding chlorine.

In recent years, alternative water treatment methods have been developed that employ flow-through water purifiers that kill microorganisms in the water flowing through the purifiers. Examples of this type of water purifier are described in the applicants' prior U.S. Pat. No. 4,608,247 and pending U.S. Ser. No. 08/439,214, which are incorporated herein by reference. These systems have advantageously employed flow-through canisters containing compatible water purification materials to effectively kill most types of microorganisms common to swimming pools, hot tubs, and spas. Suitable oxidizing materials include halogens, such as chlorine or bromine, or peroxides such as potassium peroxymonosulfate. Suitable silver-containing materials are described, for example, in U.S. Pat. No. 5,352,369 and in U.S. Ser. No. 08/628,405, entitled "Self-Regulating Water Purification Composition" and filed Apr. 5, 1996, which are incorporated herein by reference. Examples of these purification materials include silver metal on a support. The support can be a ceramic and can include an inorganic oxide, e.g., an aluminum oxide. The silver can be chemically deposited on the ceramic support or dispersed as a powder, shavings, or turnings with the ceramic support. The purification material can include a second metal, preferably zinc, copper, aluminum, iron, or manganese, most preferably, zinc.

Several commercially available water pumps for pools, spas and the like have attached strainer baskets for straining large debris from the water entering the pump, so as to protect the pump from being clogged or from damage caused by debris.

SUMMARY OF THE INVENTION

In one aspect of the invention, a water-purifying device has a housing with an inlet, an outlet, and both a strainer and a water purification material disposed within the housing.

A preferred embodiment of the invention includes a deflector that separates a flow of water entering the housing through the inlet into a first portion and a second portion, and directs the first portion to the water purification material. The deflector is preferably connected to a support plate between the water purification material and the strainer, the water purification material being supported by the support plate.

In the current embodiment, the housing is made up of a purifier housing and a strainer housing. The water purification material is disposed within the purifier housing and the strainer is disposed within the strainer housing. The purifier housing and strainer housing are detachably connected, and the support plate is detachably connected to the purifier housing.

In some embodiments, the support plate has an inlet region through which the first portion of the flow of water enters the purifier housing, and an outlet region through which the first portion of the flow of water exits the purifier housing into the strainer housing.

An air bleed valve is located near the top of the housing in some embodiments.

In some situations a water pump includes the water-purifying device.

The water purification material, in some embodiments, contains silver. In some other embodiments, the water purification material contains chlorine. In yet other embodiments, both a silver-containing material and an oxidizing material, such as chlorine, are used.

In another aspect of the invention, an attachment to a water-straining device has a purifier housing with an internal cavity, a support plate removably attached to the purifier housing and having an inlet region and an outlet region, and a deflector extending from the support plate between the inlet and outlet regions.

In a particularly advantageous embodiment, the attachment also has a water purification material within the cavity. In some arrangements, the attachment has a connector for joining the attachment to a water-straining device.

In another aspect of the invention, a method of constructing a water purification system includes attaching to the body (the body having a water inlet, a water outlet, and a strainer positioned between the water inlet and the water outlet) a purifier housing containing a water purification material. A portion of water flowing into the water inlet contacts the water purification material.

In another aspect of the invention, a method of purifying water includes flowing water into a housing through an inlet, separating the flow of water into first and second portions, passing the first portion of flow of water across a water-purifying material such that the portion of flow of water contacts the water-purifying material, recombining the first and second portions into a recombined flow, passing the recombined flow of water through a strainer, and flowing the recombined flow out of the housing through an outlet.

In present configurations the water is swimming pool water, spa water, cooling tower water or fountain water.

As used herein, the term "strainer" refers to a device with holes or openings through which water flows to strain out debris carried by the flow of water that might cause pump damage. The strainer may be a basket, plate, web or other form, and may be located, e.g., near the inlet to a pump.

The structure of the invention can advantageously purify and strain water in an efficiently packaged space, adjacent a standard water pump, and can enable already installed water straining systems to be economically modified to perform the additional function of water purification. The purification system can also be rendered less susceptible to debris clogging, as debris blocked by the support plate can fall into the strainer housing and not accumulate at the inlet region of the purifier housing.

DESCRIPTION OF THE PREFERRED EMBODIMENT

Figure 1:
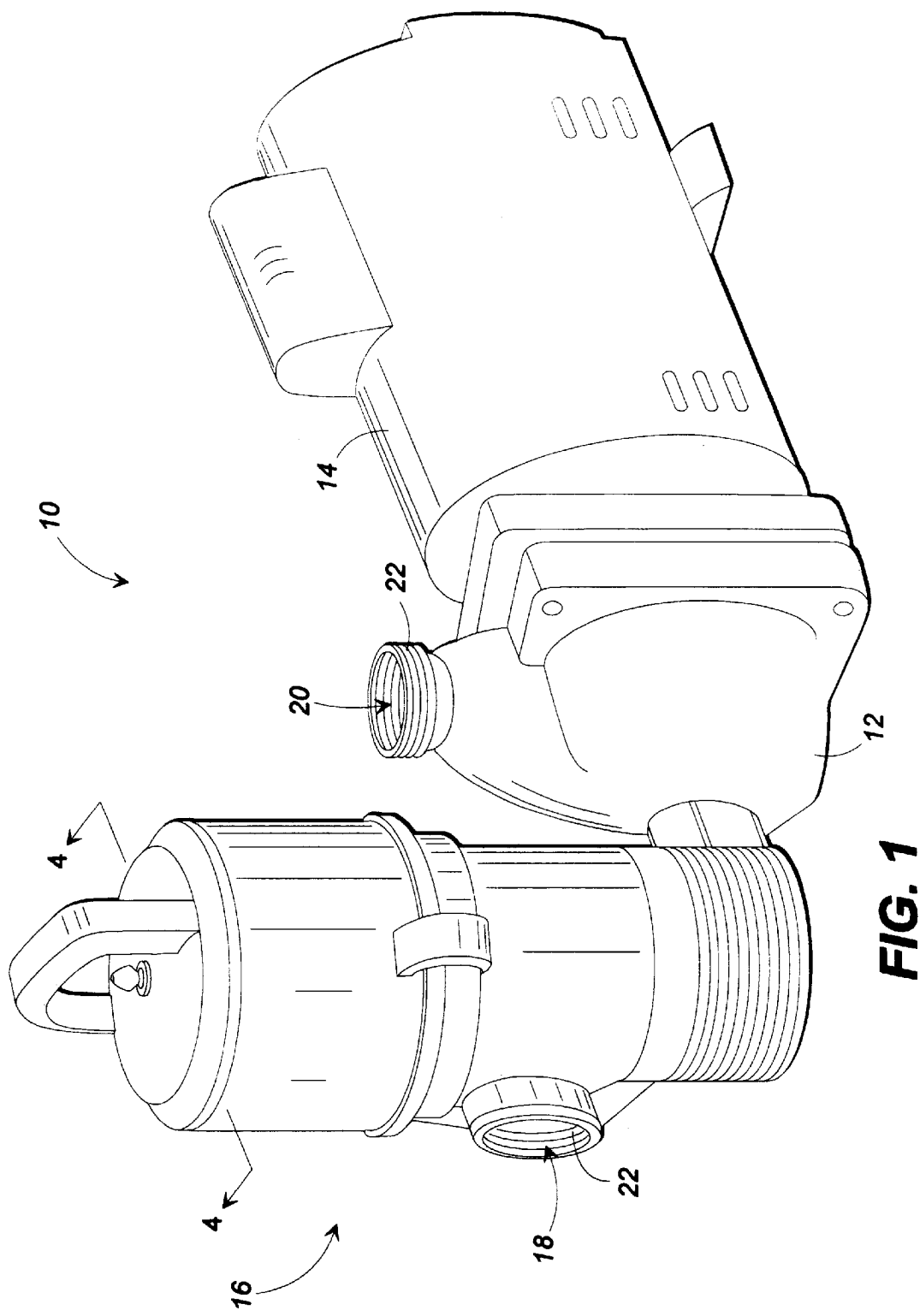
FIG. 1 is a perspective view of a water pump assembly.

Referring to FIG. 1, a water pump assembly 10 includes a pump 12 driven by an electric motor 14, and a water-purifying device 16. The pump assembly has a water inlet 18 and a water outlet 20, each with standard threads 22 for connecting water conduits or hoses (not shown).

Figure 2:
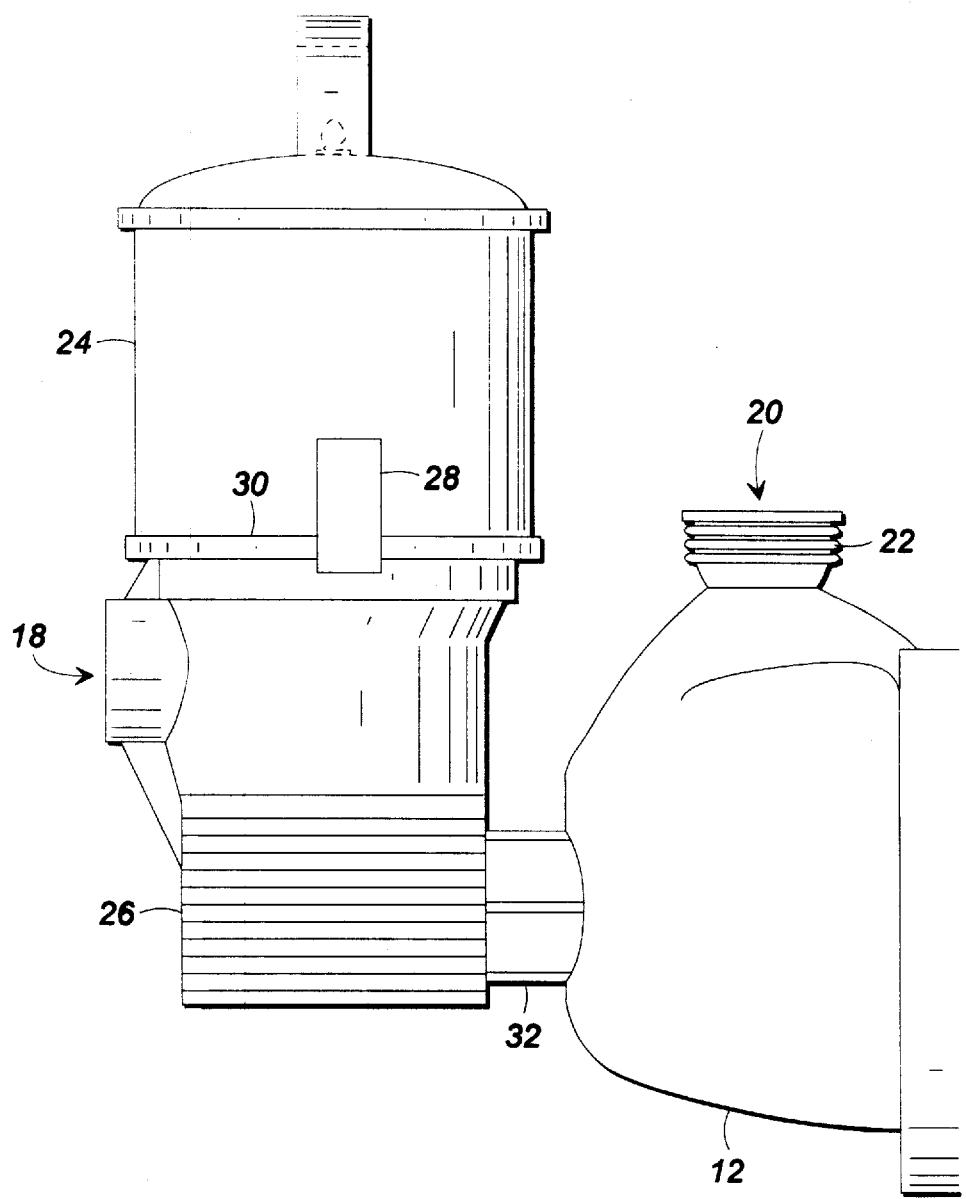
FIG. 2 is an enlarged side elevational view of the water-purifying device of the pump assembly of FIG. 1.

Referring to FIG. 2, water-purifying device 16 has a purifier housing 24 and a strainer housing 26. Housing connectors 28, one on each side of device 16, clamp the purifier housing and strainer housing together along a sealed joint 30. In the preferred embodiment an o-ring (not shown) is used to keep sealed joint 30 water tight, although other sealing methods may be employed. Water enters water-purifying device 16 through inlet 18 located on strainer housing 26, and exits into pump 12 through bulkhead outlet 32.

Figure 3:
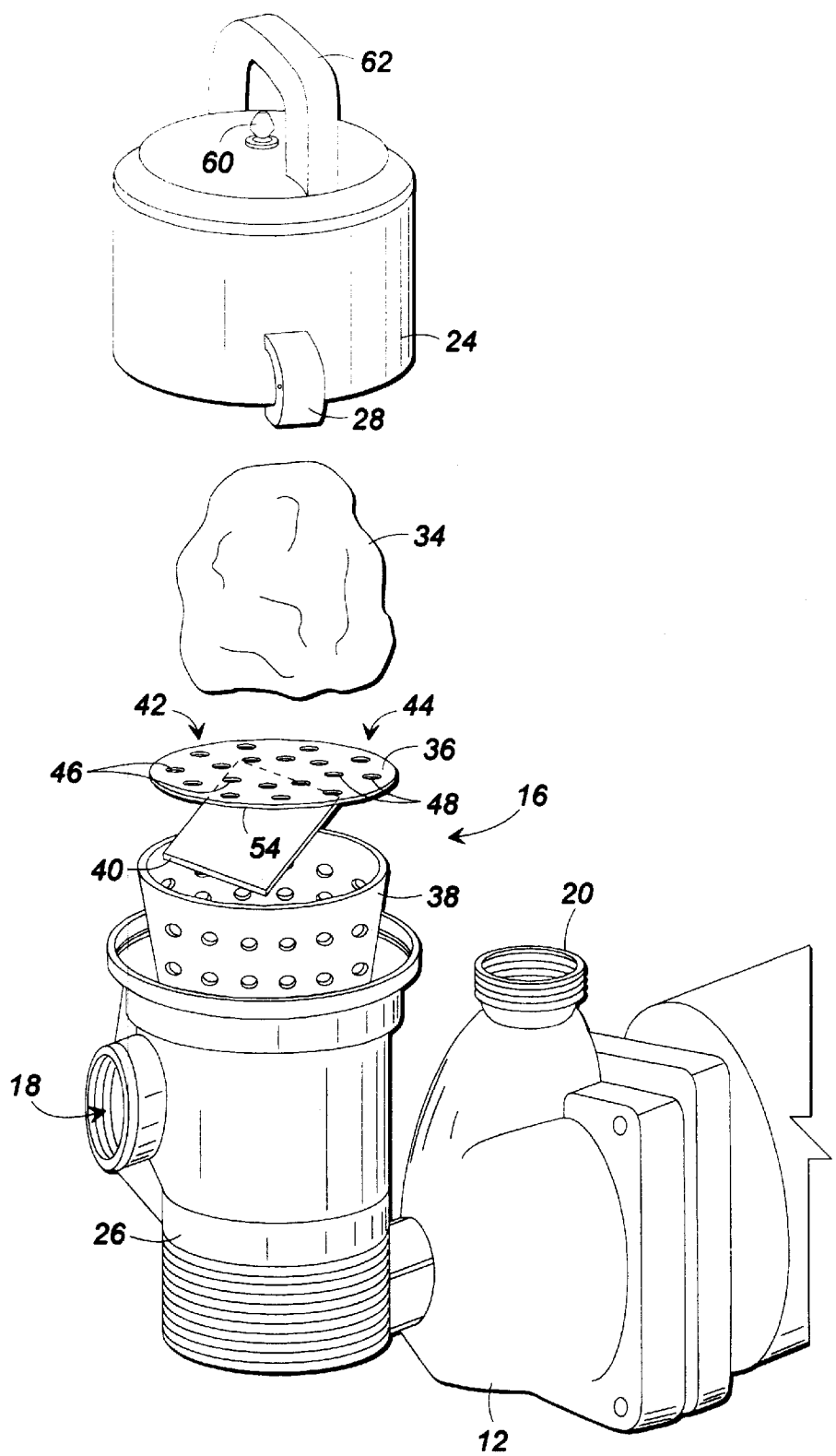
FIG. 3 is an exploded view of the water-purifying device.

Referring to FIG. 3, purifier housing 24 may be removed from strainer housing 26 by releasing housing connectors 28. Inside water purifying device 16 are a water purification material 34, a support plate 36, and a strainer basket 38. Strainer basket 38 has several holes 52 (FIG. 4) for straining out debris from the incoming flow of water before the water enters pump 12. Extending downward from support plate 36 is a deflector 40, separating the plate into an inlet region 42 and an outlet region 44. Inlet region 42 has several inlet holes 46, and outlet region 44 has several outlet holes 48. Water purification material 34 is diagrammatically shown as a solid mass, but may be in other shapes or forms. With purifier housing 24 removed, strainer basket 38 may be removed from the device for cleaning out debris strained from the flow of water.

Figure 4:
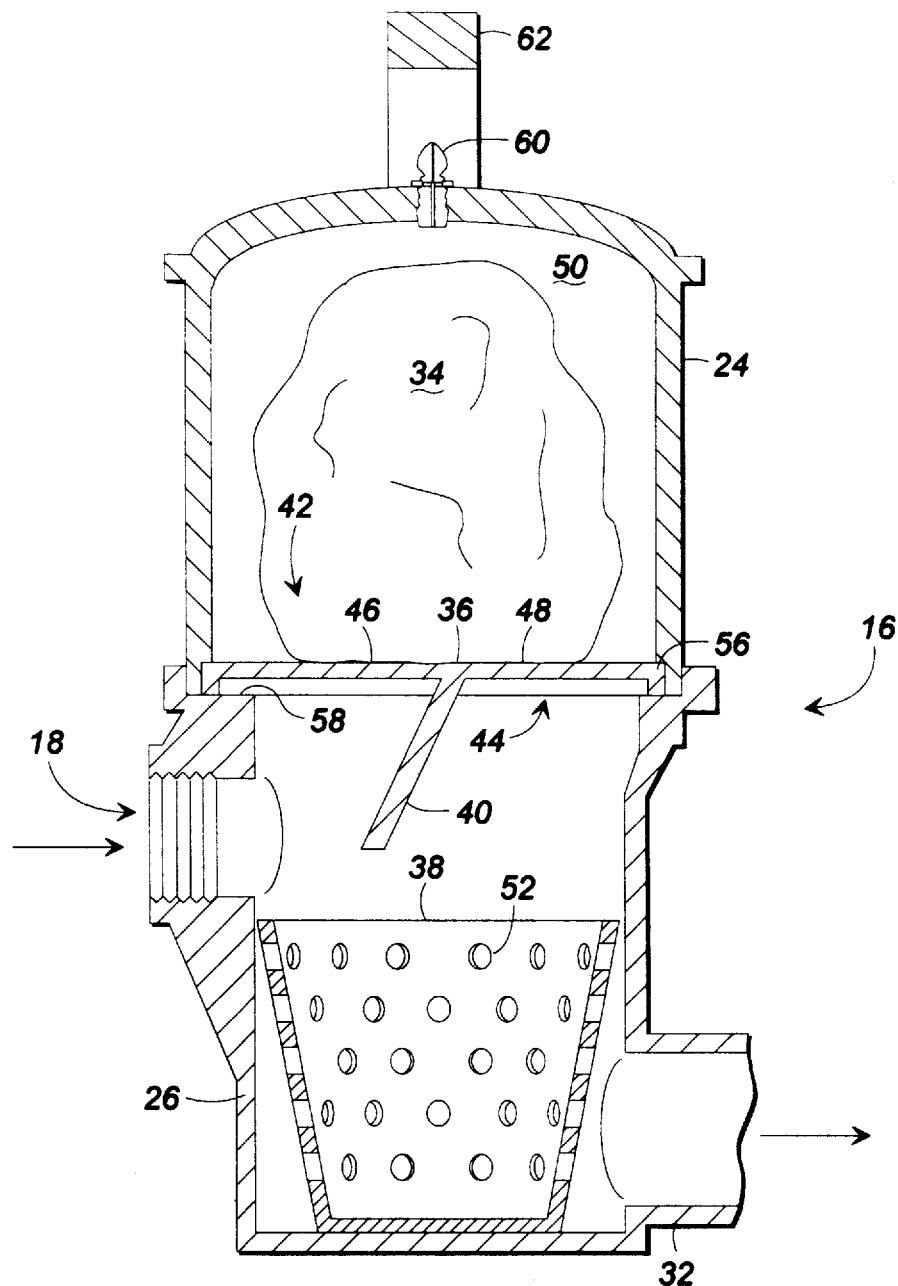
FIG. 4 is a cross-sectional view, taken along line 4—4 in FIG. 1.

Referring to FIG. 4, purifier housing 24 has an internal cavity 50 containing water purification material 34, supported within cavity 50 by support plate 36. Deflector 40 extends downward into the strainer housing 26 far enough to at least partially align with inlet 18, such that at least a portion of a flow of water entering through inlet 18 strikes deflector 40 and is directed upward through inlet holes 46 into cavity 50. The remainder of the entering flow passes directly through holes 52 in strainer basket 38 and exits water-purifying device 16 through bulkhead 32. The portion of the incoming flow of water directed upward into cavity 50 passes across water purification material 34, coming in contact with material 34, and exits cavity 50 through outlet holes 48, rejoining the remainder of the flow in strainer housing 26 and exiting through strainer basket 38 and bulkhead 32.

Referring also to FIG. 3, the outer rim 54 of support plate 36 is pressed against an internal shoulder 56 within purifier housing 24, adjacent to joint 30, retaining support plate 36 and water purification material 34 within purifier housing 24 when purifier housing 24 is lifted off of strainer housing 26 with the aid of handle 62. When assembled, support plate 36 is further retained against shoulder 56 by the upper surface 58 of strainer housing 26. Alternatively, support plate 36 may be retained by clips, threads, or other retention means.

An air bleed valve 60 at the top of cavity 50 in purifier housing 24 enables trapped air within cavity 50 to be released when priming pump 12.

Water purification material 34 may be in powder, granule, tablet, stick, monolithic ceramic foam, or any other suitable form, and can be contained in, for example, a mesh bag (not shown). When used to purify swimming pool water, water purification material 34 can be a silver-containing material described in U.S. Pat. No. 5,352,369 and in U.S. Ser. No. 08/628,405, or an oxidizing material such as chlorine (e.g., trichloroisocyanurate or calcium hypochlorite). In some cases, both of the above-mentioned incompatible purification materials can be employed, separated into different chambers as described by applicants in U.S. Ser. No. 08/742,778 entitled "Multi-Chamber Water Purification Device and Method of Using the Same" and filed Oct. 31, 1996, which is incorporated herein by reference.

Although strainer 38 is shown in basket-form, it should be understood that the strainer may alternatively be in the form of a straining plate or membrane.

Other embodiments may occur to those skilled in the art and are within the scope of the following claims.

What is claimed is:

1. A water-purifying device, comprising a housing with an inlet, an outlet, and both a strainer and a water purification material disposed within said housing, and a deflector that (i) separates a flow of water entering said housing through said inlet into a first portion and a second portion, (ii) directs said first portion to said water purification material, and (iii) is connected to a support plate between the water purification material and the strainer, said water purification material being supported by said support plate.

2. A water-purifying devices, comprising a housing with an inlet, an outlet, and both a strainer and a water purification material disposed within said housing, and a deflector that (i) separates a flow of water entering said housing through said inlet into a first portion and a second portion, (ii) directs said first portion to said water purification material, and (iii) is connected to a support plate between the water purification material and the strainer, said water purification material being supported by said support plate, wherein said housing comprises a purifier housing and a strainer housing, said water purification material being disposed within said purifier housing and said strainer being disposed within said strainer housing, said purifier housing and strainer housing being detachably connected.

3. The water-purifying device of claim 2 wherein said support plate is detachably connected to said purifier housing.

4. The water-purifying device of claim 2 wherein said support plate comprises an inlet region through which said first portion of said flow of water enters said purifier housing, and an outlet region through which said first portion of said flow of water exits said purifier housing into said strainer housing.

5. The water-purifying device of claim 1 comprising an air bleed valve located near the top of said housing.

6. The water-purifying device of claim 1 wherein said water purification material contains silver.

7. The water-purifying device of claim 1 wherein said water purification material contains chlorine.

8. The water-purifying device of claim 1 wherein said water purification material comprises a first, silver-containing material and a second, oxidizing material.

9. An attachment to a water-straining device comprising a purifier housing including an internal cavity, a support plate removably attached to said purifier housing and comprising an inlet region and an outlet region, and a deflector extending from said support plate between said inlet and outlet regions.

10. The attachment of claim 9 further comprising a water purification material within said cavity.

11. The attachment of claim 9 further comprising a connector for joining said attachment to a water-straining device.

* * * * *